United States Patent [19]

Schiff et al.

[11] 4,418,234

[45] Nov. 29, 1983

[54] VISCOSITY INDEX IMPROVER SOLUBLE IN SYNTHETIC POLY($\alpha$-OLEFIN) LUBRICANTS

[75] Inventors: Sidney Schiff; William J. Trepka, both of Bartlesville, Okla.

[73] Assignee: Phillips Petroleum Company, Bartlesville, Okla.

[21] Appl. No.: 331,413

[22] Filed: Dec. 16, 1981

[51] Int. Cl.$^3$ .............................................. C10M 1/18
[52] U.S. Cl. ................................. 585/12; 252/32.7 E; 252/51.5 A
[58] Field of Search .................... 585/12; 252/32.7 E, 252/51.5 A

[56] References Cited

U.S. PATENT DOCUMENTS

| | | |
|---|---|---|
| 2,798,853 | 7/1957 | Young et al. |
| 2,864,809 | 12/1958 | Jones et al. |
| 2,975,160 | 3/1961 | Zelinski |
| 3,333,024 | 7/1967 | Haefele et al. |
| 3,402,159 | 9/1968 | Hsieh |
| 3,419,365 | 12/1968 | Streets |
| 3,431,323 | 3/1969 | Jones |
| 3,531,450 | 9/1970 | Yoshimoto et al. |
| 3,547,821 | 12/1970 | McCoy et al. |
| 3,554,911 | 1/1971 | Schiff et al. |
| 3,600,311 | 8/1971 | Naiman et al. |
| 3,761,404 | 9/1973 | Calow et al. ............................ 252/39 |
| 3,994,815 | 11/1976 | Coleman .............................. 252/52 R |
| 4,073,738 | 2/1978 | Ladenberger et al. ............ 252/56 R |

FOREIGN PATENT DOCUMENTS 1497524 1/1978 United Kingdom .

*Primary Examiner*—Jacqueline V. Howard

[57] ABSTRACT

Hydrogenated completely random conjugated diene/monovinylarene copolymers with a conjugated diene content above about 50 weight percent, monovinylarene content below about 50 weight percent, vinyl unsaturation (normalized) at least about 25 weight percent, block polymonovinylarene below about 5 weight percent, and molecular weight $M_n$ in the range of about 30,000–200,000, are soluble in synthetic poly($\alpha$-olefin) lubricating oils providing therein effective viscosity index control, pour point, and shear loss at low concentrations.

15 Claims, No Drawings

VISCOSITY INDEX IMPROVER SOLUBLE IN SYNTHETIC POLY(α-OLEFIN) LUBRICANTS

FIELD OF THE INVENTION

The invention relates to additives for synthetic poly-(α-olefin) lubricating oils. In a primary aspect, the invention pertains to copolymers which are soluble in poly(α-olefin) lubricating oils, exhibit effective thickening power with low quantities of copolymer.

BACKGROUND OF THE INVENTION

While mineral oil stocks are a prime source of lubricants, an almost endless list of synthetic lubricants has been developed, including aromatic based lubricant oils, polyesters, polyglycols.

Lubricating oils normally require a variety of additives. The additives usually are classified according to their intended function such as dispersant, oxidation inhibitor, corrosion and rust inhibitor, viscosity-index (VI) improver, pour-point depressant, antiwear agents, antifoam agents, and the like.

Many materials have been prepared for use in lube oils as viscosity index improvers, such as described in U.S. Pat. Nos. 3,554,911 and 3,630,905. 3,994,815 summarizes some of the various hydrogenated arene/conjugated diene copolymers used in the lubricating oil viscosity index improver field.

However, materials soluble in mineral based oils are not necessarily soluble in or effective in synthetic oils, and, materials useful in one class of synthetic oils are rarely suitable or even soluble in other classes.

Problems particularly have arisen with the synthetic poly(α-olefin) lubricating oils in that many otherwise effective viscosity index improvers are not therein soluble. The synthetic poly(α-olefin) oils potentially have high value as lube-oils, but needed are effective viscosity index improvers specifically useful therein.

With increased costs of base petroleum stocks, it is highly desirable to find ways to improve poly(α-olefin oils) and thus hold down costs of the lubricating oils to the American motorist.

BRIEF SUMMARY OF THE INVENTION

We have discovered a specific class of hydrogenated random conjugated diene/monovinylarene copolymers specifically soluble in and useful in poly(α-olefin) synthetic lubricating oils as viscosity index improvers. Presently preferred are butadiene/styrene copolymers. We may herein below discuss butadiene and styrene as typical of as well as preferred of the conjugated dienes and monovinylarenes.

This class of defined copolymers is substantially insoluble in other classes of synthetic lubricants tested, including polyesters and polyglycols.

These copolymers are defined by the following parameters:

conjugated diene content: above about 50 weight percent and in the range of about 55 to 95 weight percent.
randomized such that block polymonovinylarene is: below about 5 percent.
molecular weight $M_n$: about 30,000 to 200,000.
vinyl unsaturation, normalized: at least about 25 percent.

Poly(α-olefin) lubricating oils and related fluids containing these additives are provided with the benefits of viscosity index improvers without adding ash forming materials into the resulting lubricating oil composition. This newly defined class of outstanding viscosity index improvers additionally are ashless.

The viscosity of lubricating oils varies with the temperature. Many oils must be employed over a wide temperature range, e.g., such as 0° F. to 300° F., and it is important that the oil not be too viscous at low temperatures nor too thin at high temperatures. Variation of the viscosity-temperature relationship of an oil is indicated by the viscosity index value. The higher the viscosity index, the less the change in viscosity with change in temperature. Viscosity at 210° F. and at 100° F. is used to determine the viscosity index.

These defined copolymers have use-ratios in poly(α-olefin) oils at any suitable effective concentration, such as about 0.2 to 10 weight percent relative to the poly(α-olefin) oil, excluding other additives.

If desired, the copolymers can be dissolved in a poly-(α-olefin) oil as a carrier to make a higher concentration concentrate which can be conveniently used by motor oil manufacturers or branders.

DETAILED DESCRIPTION OF THE INVENTION

The copolymer class which we have discovered to be particularly useful in poly(α-olefin) oil-based applications as additives are prepared by copolymerizing at least one hydrocarbon conjugated diene and at least one monovinylarene hydrocarbon, presently preferably butadiene and styrene, to produce random copolymers, and then hydrogenating to produce hydrogenated random copolymers.

These copolymers can be prepared by means known in the art by solution polymerization techniques. For example, a mixture of monovinylarene and conjugated diene can be copolymerized, controlling the rate of polymerization of each comonomer by suitable amounts of any of the known effective randomizing agents, by temperature, or by feedrate of the comonomers, to produce a copolymer of desired size.

Whatever the technique, readily practiced by those skilled in the art, the following parameters should be observed:

Conjugated diene: at least 50 weight percent, and in the range of about 55 to 95 weight percent.
Monovinylarene: less than 50 weight percent, and in the range of about 5 to 45 weight percent.
Molecular weight $M_n$: in the range of about 30,000 to 200,000.
Vinyl unsaturation, normalized: at least about 25 percent.
Block polymonovinylarene: less than about 5 percent.

The more preferred of our copolymers have ranges as follows:
Conjugated diene: about 60 to 90 weight percent.
Molecular weight $M_n$: about 50,000 to 100,000.
Vinyl unsaturation, normalized: about 30–60 percent.
Block polystyrene: Less than about 2 percent.

At present, the additives of our invention are employable in any suitable and effective amount in a poly(α-olefin) synthetic lubricating oil. An exemplary broad range is such as about 0.2 to 10, more usually 0.5 to 5, weight percent relative to the poly (α-olefin) lubricating oil. A more normal use range would be a concentration preferably in the range of about 1.5 to 2.5 weight percent. These values are relative to the poly(α-olefin)

oil excluding any other additives or colourants that may be employed.

CONJUGATED DIENE/MONOVINYLARENE COPOLYMERS

In our discussions hereinafter for simplicity and convenience we use styrene as representative of as well as the preferred monovinylarene, and butadiene as representative of as well as the preferred conjugated diene. Similarly butadiene/styrene copolymers are discussed as representative of the applicable conjugated diene/monovinylarene copolymers generally.

Conjugated diene monomers suitable for making the defined copolymers of our invention are those aliphatic hydrocarbon dienes of four to eight carbon atoms per molecule. Exemplary dienes include butadiene, isoprene, 2,3-dimethylbutadiene, piperylene, and the like.

Monovinylarene monomers suitable for use in making copolymers of our invention are the hydrocarbon monovinylarenes of eight to fifteen carbon atoms per molecule. Exemplary monovinylarenes include styrene, α-methylstyrene, 4-methylstyrene, 3,5-diethylstyrene, 4-tolylstyrene, and the like.

The copolymers are defined as random copolymers, meaning that they do not have a significant block of polystyrene homopolymer. The random copolymers generically can be represented by C/A in which C=polymerized conjugated diene, A=copolymerized monovinylarene. These copolymers can be of completely or substantially completely random character, or can be of random tapered character sometimes written as:

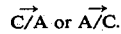

POLYMERIZATION

Polymerization is conducted by contacting the monomer charge with a monoalkali metal or dialkali metal initiator in a suitable diluent. Diluents employed for the purpose include any of the paraffinic, cycloparaffinic, or aromatic hydrocarbons known to the art, used alone or in admixture, typically of 4 to 10 carbon atoms per molecule in commercial operations. Exemplary species include such as n-heptane, cyclohexane, n-hexane, benzene, toluene, the xylenes, 2,2,4-trimethylpentane, and the like. Cyclohexane currently is preferred for ease of handling, high solubility of polymer, and availability.

Polymerization can be carried out at any convenient temperature employed in the solution polymerization arts. Exemplary are temperatures in the range of about 0° C. to 200° C., presently preferred about 40° C. to 100° C., since these temperatures are consistent with obtaining the desired copolymers. Pressures employed can be as convenient, though preferably sufficient to maintain monomers and diluent substantially in the liquid phase. Polymerization times can vary widely as may be convenient, dependent on polymerization temperatures chosen. Times preferably should be such that substantially complete conversion of monomers is obtained.

Any of the hydrocarbon di- or monolithium (or other di- or monoalkali metal) initiators known in the anionic solution polymerization arts can be employed. Typically these can be represented by $RLi_x$ wherein R is a hydrocarbon radical and can be aliphatic, cycloaliphatic, or aromatic, containing at least one carbon atom per molecule; and x is 1 or 2. The number of carbon atoms and consequently the molecular weight of the hydrocarbon lithium initiator is not limited as far as operability is concerned, though those of up to about 20 carbon atoms are more readily available. Most frequently employed are the aliphatic monolithium types.

Exemplary species include such as n-butyllithium, sec-butyllithium, n-decyllithium, phenyllithium, 1-naphthyllithium, p-tolyllithium, cyclohexyllithium, eicosyllithium, and the like, and similar di-lithio species. The presently preferred species are sec-butyllithium and n-butyllithium for commercial availability. If an n-alkyllithium initiator is employed, it usually is advisable to include a minimial amount of a polar compound, such as tetrahydrofuran, to increase initiator activity and efficiency. Such a polar compound may also act as a randomizer.

The amount of initiators employed should be effective for polymerization of the monomer charge employed to the molecular weight desired. Typically an exemplary amount is in the range of about 0.33 to 5 mhm, millimoles per 100 grams of monomer, presently preferred about 1 to 4 mhm, consistent with obtaining polymers of desired molecular weight ranges.

To prepare the copolymeric structure, a feed of each monomer or of a mixture of the butadiene and styrene monomers is copolymerized in desired proportions under randomizing conditions to produce the C/A copolymer. Randomization can be effected either by controlled feed of monomers, or by employment of a randomizing amount of a randomizing agent, or both, so long as the copolymer contains substantially no more than about 5 percent block poly(monovinylarene).

A randomizing agent, where used, can be typically selected from ethers, thioethers, and amines, and others as is known in the art, such as tetrahydrofuran, or from the alkali metal alkoxides other than of lithium, such as potassium t-butoxide or amyloxide; and others such as 1,2-dimethoxyethane, dimethyl ether, N,N,N',N'-tetramethylethylenediamine, bis(2-methoxyethyl)ether, and 1,2-bis(2-methoxyethoxy)ethane.

The reactants, apparatus involved, diluents, and the like should be maintained substantially free of various substances known to be detrimental to the initiator, including such as carbon dioxide, oxygen or water, and the like.

HYDROGENATION

The hydrogenation procedure employed should be effective so as to substantially reduce olefinic unsaturation, including vinyl unsaturation, while leaving essentially untouched aromatic unsaturation present in the styrene-derived units of the copolymer.

Hydrogenation can be conveniently conducted directly on the unquenched polymerization reaction admixture from the polymerization procedure described above. Alternatively, the copolymerization can be quenched by addition of suitable amounts of a lower alcohol, water, or the like, to effectively kill active polymer-lithium species. The quenched copolymer then can be coagulated and recovered, by means known in the art, such as by steam-stripping. For hydrogenation purposes, the unsaturated copolymers can be employed as prepared as a polymer-cement resulting from copolymerization without recovery, or can be dissolved or redissolved in a suitable hydrocarbon solvent, such as from among those described as for polymerization diluents. Hydrogenation is accomplished by treating the random butadiene/styrene copolymer dissolved in such a solvent, by means known in the art for this purpose.

Particularly favorable hydrogenation catalysts comprise reaction products of aluminum alkyl compounds with either nickel or cobalt carboxylates or alkoxides. Typical of the aluminum alkyl compounds are such as triisobutylaluminum, triethylaluminum, tri-n-propylaluminum, and the like. Exemplary nickel or cobalt carboxylates or alkoxides include the nickel and cobalt acetates, propionates, benzoates, octoates, and the butoxides, ethoxides, isopropoxides, and the like. Other suitable hydrogenation catalysts include reduced nickel-kieselguhr.

Exemplary are hydrogenation temperatures in the range of about 25° C. to 175° C. Pressures can range up to such as about 1,000 psig. Times can range from a few minutes such as about 30 minutes to several hours such as 4 hours or more, influenced not only by the temperature and pressure chosen, but also by the concentration of the copolymer in the diluent, since this affects the viscosity of the copolymeric solution being treated.

Effective selective hydrogenation reduces at least about 95 weight percent or more of the olefinic groups and no more than about 5 percent or less of the phenyl groups, as determined by infrared analysis for olefin content and U.V. analysis for phenyl content.

Following completion of the copolymer hydrogenation step, the hydrogenation catalyst is deactivated and removed by any of the usual means known in the art. A typical procedure includes the addition of a solution of such as phosphoric acid and ammonium phosphate in such as about a 1:4 weight ratio, followed by introduction of air to convert the catalyst metals to insoluble phosphates, and removal thereof by filtration. The hydrogenated copolymer can be recovered by known methods, such as alcohol coagulation or steam-stripping, and dried under reduced pressure.

OIL COMPOSITIONS

The copolymeric compositions in accordance with our invention can be incorporated as needed into poly($\alpha$-olefin) based synthetic oils including lubricating and other oils using any suitable procedures.

The poly($\alpha$-olefin) oils employed are generally mixtures of hydrocarbon compounds, though they are derived from essentially pure 1-olefins.

Preferably the oils are products such as are obtained by oligomerization.

Frequently, the oils have a Saybolt viscosity at 100° F. in the range of about 60 to 200 and a Saybolt viscosity at 210° F. of about 35 to 75. British Pat. No. 1,497,524 and references therein disclose processes for preparing the oils. The additives of our invention have special advantages when employed with poly($\alpha$-olefin) oils such as are obtained by oligomerization. The poly($\alpha$-olefins) are usually prepared from $\alpha$-olefins, such as 1-octene, 1-decene and 1-dodecene, by oligomerizing the monomers to form dimers, trimers and tetramers using catalysts such as $BF_3$ with promoters that complex with $BF_3$. These promoters can be alcohols such as methanol or propanol, ethers such as diethylether, polyols such as glycerol, carboxylic acids such as acetic acid, esters or ketones.

The hydrogenated product oligomers have carbon numbers (per molecule) in the range $C_{26}$–$C_{42}$. For heavier oils other than crankcase oils the carbon number can be higher. The poly($\alpha$-olefins) have a long parent chain with several side chains of $C_6$ to $C_{10}$. Many suitable lubricating compositions can be prepared, such as motor oils, gear oils, automatic transmission oils, and the like.

In addition to the additives of this invention, the lubricating compositions can comprise one or more of other additives known to those skilled in the art, such as antioxidants, pour-point depressants, dyes, detergents, etc. Examples of these additives are the metal petroleum sulfonates, zinc dialkyldithiophosphates, alkyl succinimides, and the like. To be of commercial interest as a motor oil, the lubricating composition generally preferably presently should have a viscosity index of at least about 130.

Our copolymer/poly($\alpha$-olefin) composition find use as lubricating oils, automatic transmission fluids, tractor hydraulic fluids, industrial hydraulic oils, aviation oils, and the like. Any broad effective range of copolymer in the poly($\alpha$-olefin) lube stock can be employed. As suggested, a broad use-ratio amount is in the range of about 0.2 to 10 weight percent. For most usages, the presently preferred range is about 0.5 to 5 weight percent in motor oils, and similarly in industrial hydraulic fluids. Typical usages anticipated in specific applications are about 3 to 5, preferably about 3.75, weight percent in automotive transmission fluids, about 1 to 3, preferably about 2, weight percent in industrial hydraulic fluids, about 1 to 3, preferably about 1.3, weight percent in tractor hydraulic fluids, about 0.5 to 5 weight percent in aviation oils, and about 1 to 3, preferably about 2, weight percent in motor oils.

Our additives in poly($\alpha$-olefin) oils at such as about 1.75 to 2.25 weight percent, presently the most preferred range, exhibit a viscosity of about 50–85 SUS at 99°–100° C. in poly($\alpha$-olefin) lubricating oil, viscosity index about 150–205, pour-point about −10° to −60° F., and sonic shear loss less than 5 seconds. These are highly effective benefits.

CONCENTRATES

If desired, such as for shipment to poly($\alpha$-olefin) lube oil blenders or packagers, our novel class of copolymers can be prepared as a liquid concentrate for later dilution blending. A concentration can be prepared, such as about 10–15, preferably 10–12, weight percent, in a poly($\alpha$-olefin) base stock, for example. The blender can add other additives as may be desired, and dilute with further poly($\alpha$-olefin), for particular usage-concentrations.

EXAMPLES

Examples are provided designed to further an understanding of our invention, without limiting the scope thereof. Particular species employed, particular conditions, amounts and materials, ranges and materials and the like, employed in these examples, are designed to be exemplary, and are directed to one skilled in the art, and are not intended to be limitative of the reasonable scope of our invention.

EXAMPLE I

Synthesis

Parent polymers for hydrogenatiion were prepared by bottle polymerization techniques. The polymer was hydrogenated subsequently without being isolated from solution.

The parent polymer (before hydrogenation) was analyzed for vinyl and trans unsaturation by infrared. Vinyl contents are reported as normalized values to give only the percentage vinyl unsaturation of the butadiene portion of the copolymer before hydrogenation. Molecular weights were determined by gel-permeation chromatography. All polymers were gel free.

Live cement was hydrogenated in a one-half gallon, glass Chemco reactor. Hydrogen pressure was constant 50 psig and the hydrogenation catalyst, premixed in a small amount of cyclohexane, was constituted of a 2 to 1 mole ratio of triethylaluminum and nickel octoate.

Hydrogenation catalysts was terminated by aqueous ammonium phosphate solution. Air was added after 0.5 hr at 50° C. to convert the metals to insoluble phosphates. These were removed by filtration through 10 μ-pore, polypropylene filter. The filtered polymer was isolated by alcohol coagulation. Residual unsaturation of the dried polymer was determined by infrared.

The recipe used for preparation of B/A viscosity index improvers is shown in Recipe I:

Recipe I

BUTADIENE/STYRENE RANDOM COPOLYMER VISCOSITY INDEX IMPROVER RECIPE

| | Parts |
|---|---|
| Step No. 1 (Preparation of random B/A copolymers) | |
| Cyclohexane | 760 |
| Butadiene (B) | Variable ⎫ |
| Styrene (S) | Variable ⎬ total 100 |
| THF | Variable ⎭ |
| n-Butyllithium (NBL) | Variable |
| Temp., °C. | 50 |
| Time, min. | Variable |
| Step No. 2 (Hydrogenation) | |
| Cyclohexane | 700 |
| Hydrogenation catalyst | 0.3 |
| Hydrogen, constant psig | 50 |
| Temp., °C. | 50 |
| Time, min. | 30 |
| Step No. 3 (Isolation) | |
| Aqueous ammonium phosphate (55%) | 2.0 mL |
| Temp., °C. | 50 |
| Time, Hr. | 0.5 |
| Air | pressure to 25 psig |
| Temp., °C. | 50 |
| Time, hrs. | 18 |
| Filter | — |
| Alcohol to coagulate | — |

The proportions of monomers and other reactants used in preparing a series of copolymers appears in the following Table I. Included in Table I are the copolymer properties and the blending properties of 2 percent solutions of hydrogenated copolymer dissolved in commercial Gulf Synfluid, poly(α-olefin) lubricant base stocks.

TABLE I

| | | | | Polymer Properties | | | Blending Properties[a] | | | |
|---|---|---|---|---|---|---|---|---|---|---|
| Run No. | B/S (nominal) | NBL mmoles | THF (parts) | % Vinyl | % Styrene Total | % Styrene Block | $M_w/M_n$ (thousands) | Viscosity (SUS) 40° C. | 100° C. | VI | Pour Point (°F.) |
| 1 | 50/50 | 1.67 | 0.5 | 19.4 | 51.6 | 16.2 | 50/48 | Insol. in base stock | | | |
| 2 | 75/25 | 1.67 | 0.5 | 21.6 | 25.6 | 1.7 | 62/58 | Insol. in base stock | | | |
| 3 | 90/10 | 1.67 | 0.5 | 20.7 | 10.0 | 0 | 62/57 | Insol. in base stock | | | |
| 4 | 50/50 | 1.67 | 2.0 | 31.5 | 51.7 | 6.4 | 69/60 | Insol. in base stock | | | |
| 5 | 75/25 | 1.67 | 2.0 | 36.5 | 25.3 | 0 | 60/51 | 316[c] | 64.7 | 165 | <−60 |
| 6 | 90/10 | 1.67 | 2.0 | 39.6 | 9.7 | tr | 57/54 | 332[c] | 66.8 | 167 | <−60 |
| 7[b] | 75/25 | 1.0 | 0.5 | 25.7 | 25.3 | tr | 99/90 | 278[c] | 63.5 | 183 | −10[d] |
| 8[b] | 75/25 | 1.0 | 2.0 | 37.6 | 25.2 | 0 | 104/93 | 234[c] | 58.4 | 185 | <−60 |
| 9 | 55/45 | 1.0 | 2.0 | 34.5 | 45.2 | 4.2 | 96/88 | 281[c] | 67.7 | 206 | −50 |
| 10 | 65/35 | 1.0 | 2.0 | 37.1 | 35.1 | 0 | 88/81 | 367[c] | 70.4 | 168 | <−60 |
| 11 | 75/25 | 2.5 | 2.0 | 33.2 | 25.1 | 0 | 30/29 | 263 | 58.4 | 160 | <−60 |
| 12 | 75/25 | 0.67 | 2.0 | 40.3 | 24.8 | 0 | 126/108 | 518 | 87.8 | 173 | <−60 |
| 13 | 75/25 | 1.0 | 5.0 | 47.2 | 24.1 | 0 | 113/103 | 415 | 77.0 | 172 | −60 |
| 14 | 95/5 | 1.0 | 2.0 | 43.6 | 5.2 | 0 | 85/79 | 432 | 79.1 | 174 | <−60 |
| 15 | 75/25 | 1.0 | 0.25 | 8.1 | 24.6 | 17.5 | 98/85 | Insol. in base stock | | | |
| 16 | 40/60 | N.A.[f] | N.A. | 25.0 | — | 19.0 | 84/65 | Insol. in base stock | | | |
| Synfluid 4cs[e] | — | — | — | — | — | — | .92 | 39 | 124 | <−60 |
| Synfluid 6cs[e] | — | — | — | — | — | — | 151 | 45 | 132 | <−60 |

[a]2% polymer dissolved by stirring at 128° C. under $N_2$ in 6cs Gulf Synfluid poly(α-olefin) having 6 centistoke viscosity at 100° C.
[b]2% polymer dissolved by stirring at 128° C. under $N_2$ in 4cs Gulf Synfluid poly(α-olefin) having 4 centistoke viscosity at 100° C.
[c]hazy
[d]This apparently high pour point can be readily lowered, if desired, by adding a commercial pour point depressant.
[e]Blending stocks without copolymer.
[f]N.A. = Amount not available.

Run 16 shows that random butadiene/styrene copolymers with less than 50 parts butadiene and more than 5 percent block styrene are insoluble in poly(α-olefins).

The data in Table I show that less than 25 percent vinyl content or more than 5 percent block styrene will result in an insoluble copolymer at a concentration of 2 percent in poly(α-olefin). The data show the copolymers that are within the limits of our claimed invention improve the viscosity index of the base stock.

The disclosure, including data, illustrate the value and effectiveness of our invention. The examples, the knowledge and background of the field of the invention and general principles of chemistry and other applicable sciences have formed the basis from which the broad descriptions of the invention including the ranges of conditions and generic groups of operant components have been developed, which have formed the basis for our claims here appended.

We claim:

1. Shear-stable, poly(α-olefin) oil-based compositions comprising a major amount of a poly(α-olefin) base oil, and a minor effective viscosity improving amount of a poly(α-olefin) oil-soluble hydrogenated conjugated diene/monovinylarene random copolymer dissolved therein, said random copolymer characterized by:

| | |
|---|---|
| polymerized conjugated diene content: | about 55-95 weight percent |
| copolymerized monovinylarene content: | about 5-45 weight percent |
| molecular weight $M_n$: | about 30,000 to 200,000 |
| vinyl unsaturation, normalized: | at least about 25 percent |
| block polymonovinylarene | less than about 5 percent. |

2. The poly(α-olefin) oil-based composition according to claim 1 wherein said random copolymer is characterized by:

| | |
|---|---|
| polymerized conjugated diene content: | about 60-90 weight percent |
| copolymerized monovinylarene content: | about 10-40 weight percent |
| molecular weight $M_n$: | about 50,000 to 100,000 |
| vinyl unsaturation, normalized: | about 30 to 60 percent |
| block polymonovinylarene | less than about 2 percent. |

3. The poly(α-olefin) oil based composition according to claim 1 or 2 wherein the poly(α-olefin) oil is a lubricating oil and has a viscosity at 210° F. in the range of about 35 to 75 SUS, and contains said random copolymer in a range of about 0.2 to 10 weight percent relative to said poly(α-olefin) oil excluding other additives.

4. The poly(α-olefin) oil-based composition according to claim 3 wherein said random copolymer is employed in an amount in the range of about 0.5 to 5 weight percent relative to the poly(α-olefin) oil excluding other additives.

5. The poly(α-olefin) oil-based composition according to claim 4 wherein said random copolymer is a copolymer of butadiene and styrene.

6. The poly(α-olefin) oil-based composition according to claim 5 wherein said random copolymer is a butadiene-styrene 75/25 copolymer.

7. The poly(α-olefin) oil-based composition of claim 5 wherein said poly(α-olefin) base oil is a lubricating oil, containing said random copolymer in an amount of about 0.5 to 5 weight percent relative to the poly(α-olefin) base oil.

8. The poly(α-olefin) oil-based composition of claim 5 wherein said poly(α-olefin) base oil is an automotive transmission fluid containing said random copolymer in an amount of about 3 to 5 weight percent relative to said poly(α-olefin) oil.

9. The poly(α-olefin) oil-based composition of claim 5 wherein said poly(α-olefin) base oil is an aviation oil containing said random copolymer in an amount of about 0.5 to 5 weight percent relative to said poly(α-olefin) oil.

10. A poly(α-olefin) oil concentrate containing 10 to 15 weight percent of a hydrogenated conjugated diene/monovinylarene random copolymer characterized by the following parameters prior to hydrogenation:

| | |
|---|---|
| polymerized conjugated diene content: | about 55-95 weight percent |
| copolymerized monovinylarene content: | about 5-45 weight percent |
| molecular weight $M_n$: | about 30,000 to 200,000 |
| vinyl unsaturation, normalized: | at least about 25 percent |
| block polymonovinylarene: | less than about 5 percent | wherein the extent of hydrogenation is sufficient to substantially saturate olefinic double bonds, without substantial saturation of aromatic double bonds and the balance a poly(α-olefin) oil.

11. The concentrate according to claim 10 wherein said hydrogenated random copolymer is characterized by the following parameters prior to hydrogenation:

| | |
|---|---|
| polymerized conjugated diene content: | about 60-90 weight percent |
| copolymerized monovinylarene content: | about 10-40 weight percent |
| molecular weight $M_n$: | about 50,000 to 100,000 |
| vinyl unsaturation, normalized: | about 30-60 percent |
| block polymonovinylarene: | less than about 2 percent. |

12. The concentrate according to claim 11 wherein said hydrogenated random copolymer is a copolymer of butadiene and styrene.

13. The concentrate according to claim 12 wherein said random copolymer is a butadiene/styrene 75/25 copolymer.

14. The poly(α-olefin) oil-based composition of any of claims 1, 2, 4, 5, 6, 7, 8, 9, 10, 11, 12, or 13 wherein said poly(α-olefin) oil is an oil containing poly(α-olefins) in the range of $C_{26}$–$C_{42}$ carbon numbers.

15. The poly(α-olefin) oil-based composition of claim 3 wherein said poly(α-olefin) oil is an oil containing poly(α-olefins) in the range of $C_{26}$–$C_{42}$ carbon numbers.

* * * * *